United States Patent [19]

Dennis

[11] Patent Number: 5,893,614
[45] Date of Patent: Apr. 13, 1999

[54] AERODYNAMIC BICYCLE WHEEL APPARATUS

[76] Inventor: Craig William Dennis, 921 Pittwater Road, Collaroy, New South Wales, 2097, Australia

[21] Appl. No.: 08/856,384

[22] Filed: May 14, 1997

[30] Foreign Application Priority Data

May 20, 1996 [AU] Australia .................. 52390/96

[51] Int. Cl.$^6$ .................................................. B60B 7/01
[52] U.S. Cl. ................................. 301/37.41; 301/37.1
[58] Field of Search ................ 301/37.1, 37.24, 301/37.37, 37.41, 95, 96, 97, 98, 104; 244/103 R, 103 W, 100

[56] References Cited

U.S. PATENT DOCUMENTS

| | | | |
|---|---|---|---|
| 1,359,647 | 11/1920 | Abbott, Jr. | 301/37.41 X |
| 3,317,246 | 5/1967 | Wester | 301/37.41 |
| 4,418,962 | 12/1983 | Schaffer | 301/37.41 X |
| 4,660,893 | 4/1987 | Huntzinger. | |
| 4,682,821 | 7/1987 | Strazis. | |
| 4,978,174 | 12/1990 | Nosler. | |
| 5,131,727 | 7/1992 | Johnson | 301/37.42 |

FOREIGN PATENT DOCUMENTS

| | | | |
|---|---|---|---|
| 638683 | 2/1928 | France | 244/103 R |
| 2378642 | 8/1978 | France. | |
| 2493770 | 5/1982 | France. | |
| 267954 | 5/1989 | Germany | 301/37.41 |
| 8700802 | 2/1987 | WIPO. | |

*Primary Examiner*—Russell D. Stormer
*Attorney, Agent, or Firm*—Edwin D. Schindler

[57] ABSTRACT

An apparatus for improving the aerodynamic performances of conventionally spoked bicycle wheels or the like, the apparatus comprising a pair of rings (10) being adapted to be located one on either side of the spokes of the wheel and abutting against the wheel's inside rim at their most radial outward portion (11) and extending inwardly towards the wheel's axle. The rings (10) are releasably mated at the most radial inward portion (13) with apertures (16) formed when so mated. The apertures (16) are formed about the spokes when located thereon with the outer surface (12) of the pair of rings (10) forming an aerodynamic surface extending radially inwardly from the wheel's inner rim.

6 Claims, 4 Drawing Sheets

AERODYNAMIC BICYCLE WHEEL APPARATUS

The present invention relates to wheels and, in particular, to an apparatus which is able to be fitted to a spoked bicycle wheel or the like device to provide an improvement in the aerodynamic performance of the spoked wheel or like device as well as maintaining the strength and stiffness required for the wheel to absorb road shock and the like.

BACKGROUND TO THE INVENTION

Although the following description refers primarily to bicycles, it will be readily appreciated that other means of propulsion may equally benefit from employment of the inventive principles. Consequently any reference to a bicycle is meant to encompass any similar mode of transport whereby suitable application, modification or adaptation of the invention can be applied.

It has long been recognised that the aerodynamics of a bicycle are strongly effected by the aerodynamic performance of the wheels in particular. This is particularly true for racing, but is equally applicable to leisure pursuits involving bicycles. In other words the better aerodynamic performance of the wheels of a bicycle, the easier it is to ride. A cyclist has in any event to pedal to propel himself forward and any substantial drag caused by the bicycle, and the wheels in particular, lessens the speed obtainable by the cyclist for the effort expended.

It is known for racing bicycles in particular to have at least the rear wheel made from a lightweight material in the form of a disc. The aerodynamics of such a disc wheel are such that the drag on the bicycle is lessened when compared to the conventionally spoked wheel. These types of disc wheels are usually made from a composite material and although extremely light in weight, they are relatively stiff and easily damaged and as such are suited for use on a racing track where the surface is extremely even. These types of wheels are unsuitable for use on uneven surfaces as they are easily damaged if they strike any protrusion such as can be found on roads or similar surfaces.

In addition, these types of disc wheels are most suitable when used on indoor tracks because when they are used outdoors problems arise with regard to crosswinds which tend to cause aerodynamic drag. This drag removes the advantages gained in the aerodynamic performance of the wheels due to their disc nature.

Further to the above, there are known wheels which have been designed to overcome the above mentioned disadvantage by providing a lightweight spoked wheel whereby the at least three spokes and rim are made from composite materials of a similar nature to the composite discs. The rim extends inwardly towards the axle a short distance for strength and to provide an aerodynamic advantage over a conventionally spoked bicycle wheel. These wheels are supposed to absorb road shock and the like and reduce fatigue of the composite material, while reducing the drag caused by cross winds to the above described disc wheels while also providing improvements in aerodynamic performance over the conventionally spoked bicycle wheel.

However, it has been found that these wheels are also easily damaged if used on roads or the like and especially if the road conditions are rough. These wheels are not easily able to be repaired. This means that if the wheel is only slightly damaged, the wheel will have to be discarded as it is unable to perform as it is supposed. This is a relatively expensive wheel to purchase and therefore as they appear to be easily damaged, they have not been universally adopted.

Another type of bicycle wheel that is known and which has been developed to overcome the disadvantages associated with the aerodynamics of conventionally spoked bicycle wheels is a wheel that includes an annulus shaped rim which extends substantially inwardly from the outer edge and a number of metal spokes which extend between the axle and the annulus shaped rim in the same manner as a conventionally spoked bicycle wheel. The metal spokes are embedded into the annulus shaped rim which is made from plastics materials such as carbon fiber resins.

In a similar manner to the previously described wheels, this wheel has the disadvantage that if the wheel is only slightly damaged it will have to be discarded as it is unable to be repaired satisfactorily for its intended use.

Therefore it would be advantageous to provide a wheel and/or wheel apparatus which enables the cyclist to have improved aerodynamic performance as compared to a conventionally spoked bicycle wheel as well as being a wheel and/or wheel apparatus which is easily repaired when damaged. Such an apparatus could be able to be adapted to be applied to a conventionally spoked wheel such that the conventionally spoked bicycle wheel is improved aerodynamically without the need to use the costly wheels as described above.

OBJECT OF THE INVENTION

It is an object of the present invention to provide apparatus for improving the aerodynamic performances of conventionally spoked bicycle wheels which substantially overcomes or ameliorates the above mentioned disadvantages. At the very least, the object of the invention is to provide an alternative to known means of improving the aerodynamic performance of bicycle wheels.

DISCLOSURE OF THE INVENTION

According to one aspect of the present invention there is disclosed an apparatus for improving the aerodynamic performances of conventionally spoked bicycle wheels or the like, said apparatus comprising a pair of rings being adapted to be located one on either side of the spokes of said wheel and abutting against the inner surface of the rim of said wheel at their most radial outward portion and extending inwardly towards the wheel's axle, wherein said rings are releasably mated at their most radial inward portion with apertures formed when so mated, said apertures being formed about the spokes when located thereon, the outer surface of said pair of rings forming an aerodynamic surface extending radially inwardly from the inner surface of the rim of said wheel.

Preferably, the inner surfaces of the rings are adapted to mate with each other when the rings are located on the wheel, the inner surfaces of the rings being adapted to abut against the spokes of the wheel.

In one preferable form, the rings are releasably connected by holding means which in the most preferable form is a plurality of threaded grub screws. Naturally other means of connection are envisaged by the invention.

Preferably, the rings have access means for a valve extension means to be applied to the valve of the inner tube so that the tire pressure can be adjusted while the rings are in place. Preferably the access means is a groove cut into the inner surface of the rings.

BRIEF DESCRIPTION OF THE DRAWINGS

The present invention will be better understood and appreciated from the following discussion of a number of preferred forms of the invention. Reference is made to the accompanying drawings in which.

BEST MODE OF CARRYING OUT THE INVENTION

Figure 1:
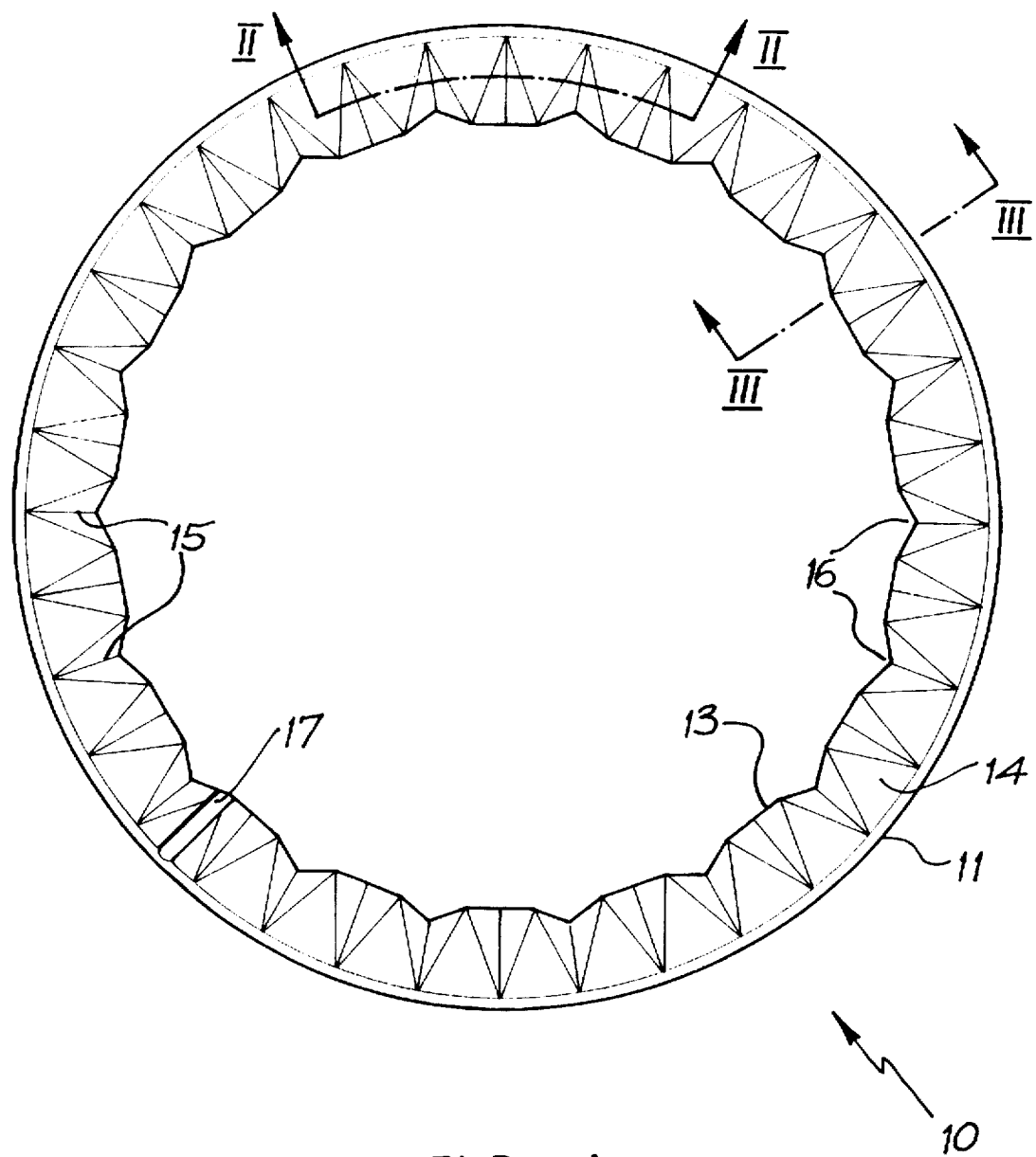
FIG. 1 is a schematic view of the inner surface of a ring of the apparatus according to the present invention.
Figure 2:
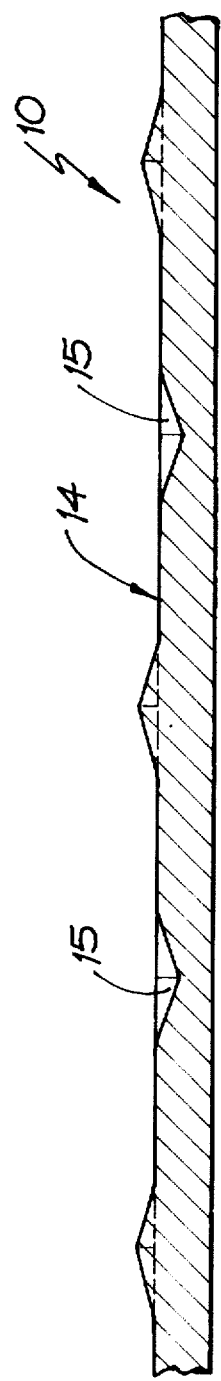
FIG. 2 is a partial cutaway circumferential cross sectional view II—II of the ring of the apparatus of FIG. 1.
Figure 4:
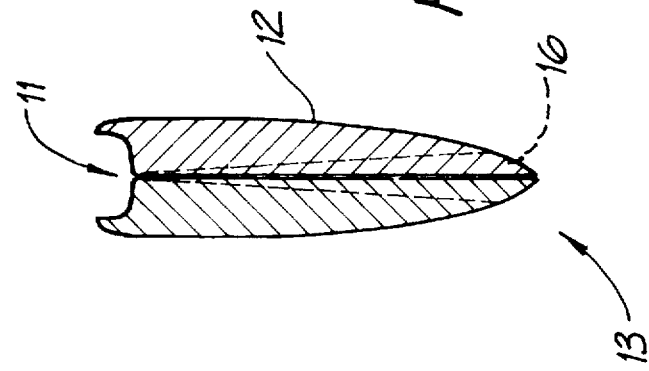
FIG. 4 is a schematic cross sectional view of the pairs of rings of the apparatus of FIG. 1 shown connected in their aerodynamic configuration.
Figure 3:
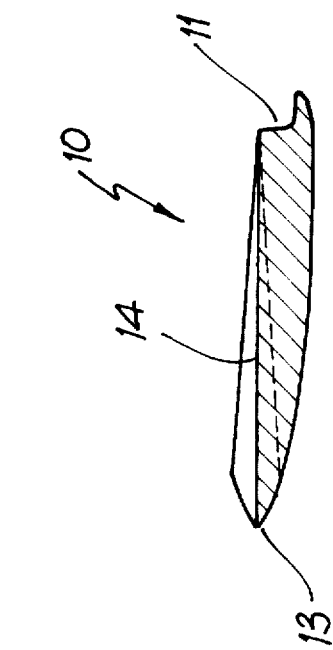
FIG. 3 is a transverse cross sectional view III—III of the ring of the apparatus of FIG. 1.
Figure 5:
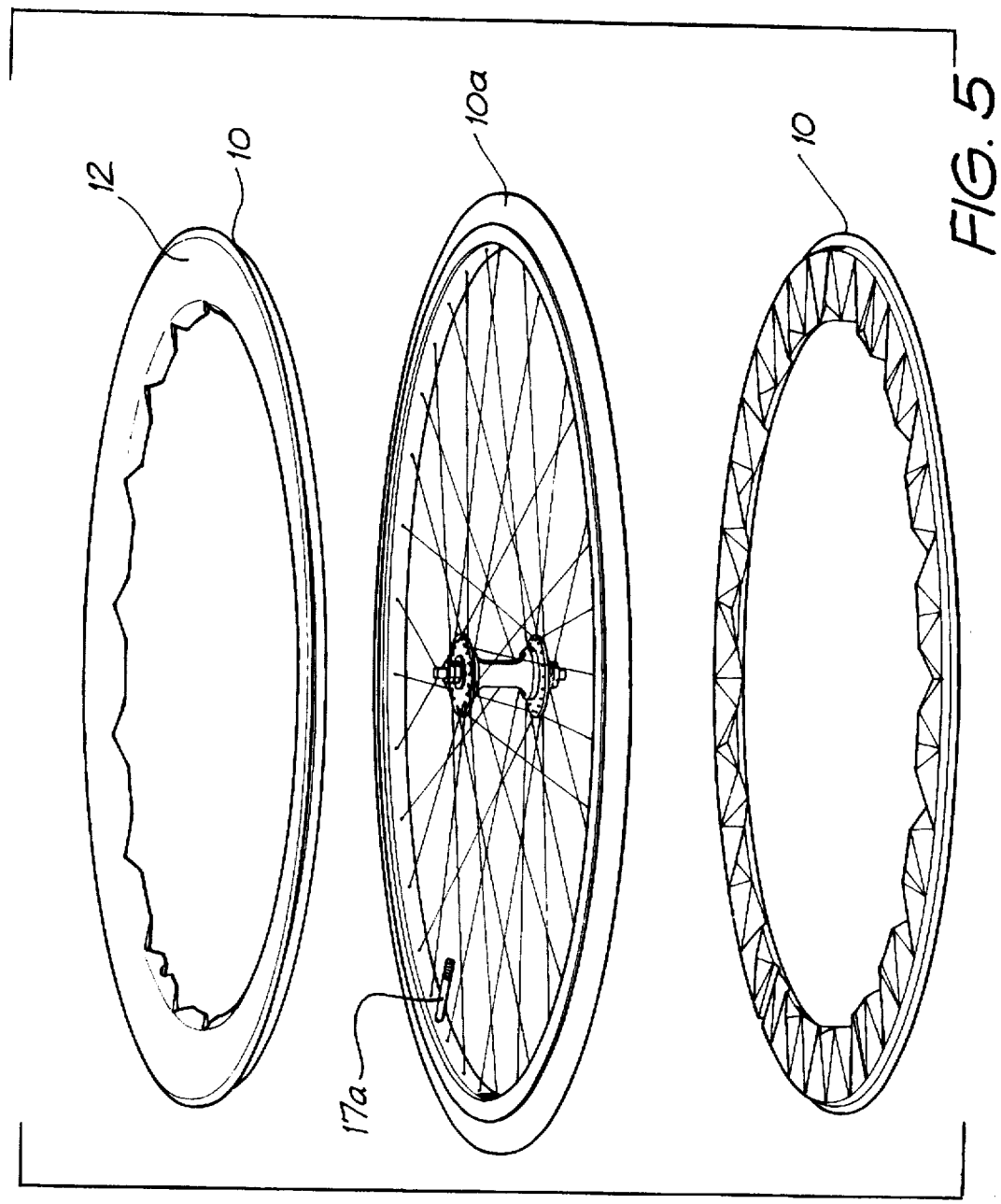
FIG. 5 is an exploded perspective view of the apparatus of FIG. 1 and a conventionally spoked bicycle wheel.
Figure 6:
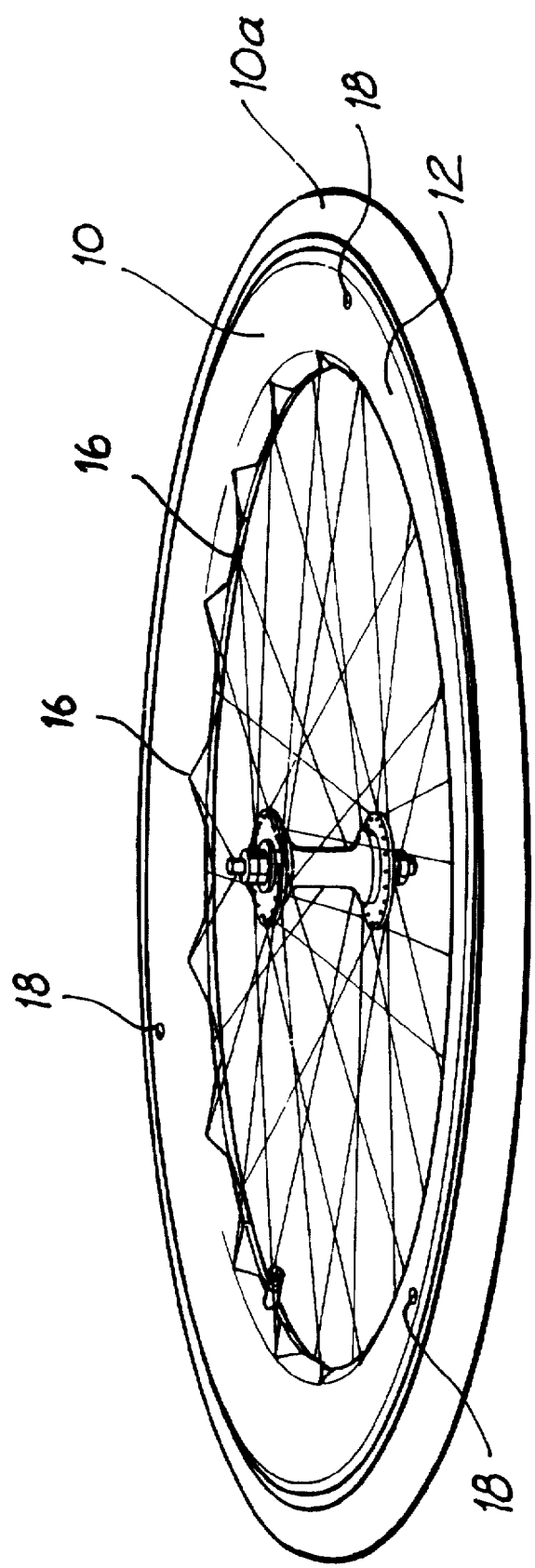
FIG. 6 is a perspective view of the apparatus of FIG. 1 shown attached to a conventionally spoked bicycle wheel.

The apparatus of the present invention includes a pair of rings 10 which are adapted to be applied to a conventionally spoked bicycle wheel 10a to provide better aerodynamic performance. The rings 10 are able to be located one on either side of the spokes of the wheel abutting against the wheel's inside rim at their most radial outward portion 11. The rings 10 extend radially inwardly from the rim towards the wheel's axle with their outer surfaces 12 forming the aerodynamic surface which is substantially flush with the outer surface of the rim of the wheel when applied to the wheel. The aerodynamic outer surfaces 12 as seen in FIG. 4 curve inwardly towards their most radial inward portion 13 which forms a foil having an arrow shaped point in cross section when the two rings 10 are joined or connected together.

The inner surfaces 14 of the rings 10 are shaped in such a way that they abut against the spokes of the wheel which are not in the same plane in a conventionally spoke bicycle wheel as they are relatively radially directed but to alternate sides of the axle. Therefore the inner surfaces 14 are saw-toothed as seen in the drawings with the valleys 15 of the saw-toothed profile receiving the spokes. The inner surfaces 14 of the two rings 10 are able to nest against or mate with the other ones inner surface 14 with the spokes positioned therebetween. The saw-toothed profile is only a preferred profile, and other profiles that result in the rings 10 being locatable on the wheel is within the scope of the present invention.

The most radial inward portions 13 of the rings abut against each other with apertures 16 being formed thereat so that the spokes can protrude therefrom. The apertures 16 are therefore effectively formed around the spokes when the rings 10 are fitted to the wheel.

The rings 10 have an access for a valve extension device 17a to be applied to the valve of the inner tube (not illustrated) so that the tire pressure can be adjusted while the rings 10 are in place. In the preferred embodiment the access is a groove 17 cut into the inner surface 14 of the rings 10.

In the preferable form, the rings 10 are releasably connected by means which is in the form of a number of threaded grub screws 18. In the most preferred form the number of grub screws is three set at 120 degrees to each other substantially near the rim of the wheel. Naturally other means of connection are envisaged by the invention.

It is seen from the above description that the rings 10 are easily installed and removed from the wheel as desired. If the wheel is damaged the rings 10 can be removed while the wheel is repaired or if the wheel is not able to be repaired, the rings 10 can be used on a new or other wheel. It is also the case that if the rings 10 are damaged, the ring can be replaced without replacing the entire wheel which is the case with the prior art wheels as discussed earlier.

The rings 10 are suitable for all size wheels and wheels with differing numbers of spokes. For example, the rings 10 are equally suitable for use with 36 spokes or 16 spokes. The rings are also suitable for use with racing bicycles as well as "mountain bikes".

The rings are made from any suitable lightweight material, such as thermal plastics, carbon fibre composites and Kevlar®.

The foregoing describes only some embodiments of the present invention, and modifications obvious to those skilled in the art can be made thereto without departing from the scope of the present invention.

I claim:

1. An apparatus for improving the aerodynamic performances of conventionally spoked bicycle wheels or the like, said apparatus comprising a pair of rings having an inner surface, an outer surface, a most radial outward portion and a most radial inward portion, said pair of rings being adapted to be located on either side of the spokes of said wheel and abutting against the inner surface of the rim of said wheel at their most radial outward portion and extending inwardly towards the wheel's axle, wherein said rings are releasibly mated at their most radial inward portion with apertures being formed when said pair of rings are mated by abutting said pair of rings against the spokes of the wheel, said apertures being adjacent the spokes when said pair of rings are releasibly mated thereon, the outer surface of said pair of rings forming an aerodynamic surface extending radially inwardly from the inner surface of the rim of said wheel.

2. The apparatus as claimed in claim 1, wherein the inner surfaces of the rings are adapted to mate with each other when the rings are located on the wheel, the inner surfaces of the rings being adapted to abut against the spokes of the wheel.

3. The apparatus as claimed in claim 1, wherein the rings are releasably connected by holding means.

4. The apparatus as claimed in claim 3, wherein the holding means is a plurality of threaded grub screws.

5. The apparatus as claimed in claim 1, wherein the rings have access means for a valve extension means to be applied to the valve of the inner tube so that the tire pressure can be adjusted while the rings are in place.

6. The apparatus as claimed in claim 1, wherein the access means is a groove cut into the inner surface of the rings.

* * * * *